United States Patent [19]

Kageyama et al.

[11] 4,403,263

[45] Sep. 6, 1983

[54] SYSTEM FOR PROCESSING AUDIO PCM DIGITAL SIGNALS

[75] Inventors: Satoshi Kageyama, Yokohama; Tadashi Kojima, Yokosuka; Shigeru Todokoro, Fujisawa, all of Japan

[73] Assignee: Tokyo Shibaura Denki Kabushiki Kaisha, Kawasaki, Japan

[21] Appl. No.: 206,833

[22] Filed: Nov. 14, 1980

[30] Foreign Application Priority Data

Nov. 16, 1979 [JP] Japan ................. 54-147663

[51] Int. Cl.³ ................. G11B 5/00; G11B 5/09
[52] U.S. Cl. ................. 360/32; 360/53
[58] Field of Search ................. 360/32, 53, 38

[56] References Cited

U.S. PATENT DOCUMENTS

| | | | |
|---|---|---|---|
| 4,146,099 | 3/1979 | Matsushima et al. | 360/38 |
| 4,224,642 | 9/1980 | Mawatari et al. | 360/32 |
| 4,227,221 | 10/1980 | Kanazawa | 360/32 |
| 4,238,852 | 12/1980 | Iga et al. | 360/32 |
| 4,277,807 | 7/1981 | Baldwin | 360/32 |
| 4,281,355 | 7/1981 | Wada et al. | 360/32 |

OTHER PUBLICATIONS

Patents Abstracts of Japan, vol. 3, No. 2, (E-83), Jan. 13, 1979, p. 95E83.
IBM Technical Disclosure Bulletin, vol. 17, No. 4, Sep. 1974, Marshall: "Error Correction Apparatus", pp. 974-976.

Primary Examiner—Vincent P. Canney
Attorney, Agent, or Firm—Oblon, Fisher, Spivak, McClelland & Maier

[57] ABSTRACT

A processing system for reproduced audio digital signals used in an audio PCM (pulse code modulation) recording/reproducing system using a recording/reproducing apparatus such as a video tape recorder having a dropout-compensation circuit is disclosed. The reproduced signal processing system is connected to receive digital information signals reproduced through the dropout compensation circuit from a recording medium on which audio information signals are recorded in the form of digital data words and includes circuit means for detecting whether a reproduced digital signal is dropout-compensated or not and circuit means for adding an error pointer to a reproduced digital signal which is detected as being dropout-compensated.

4 Claims, 7 Drawing Figures

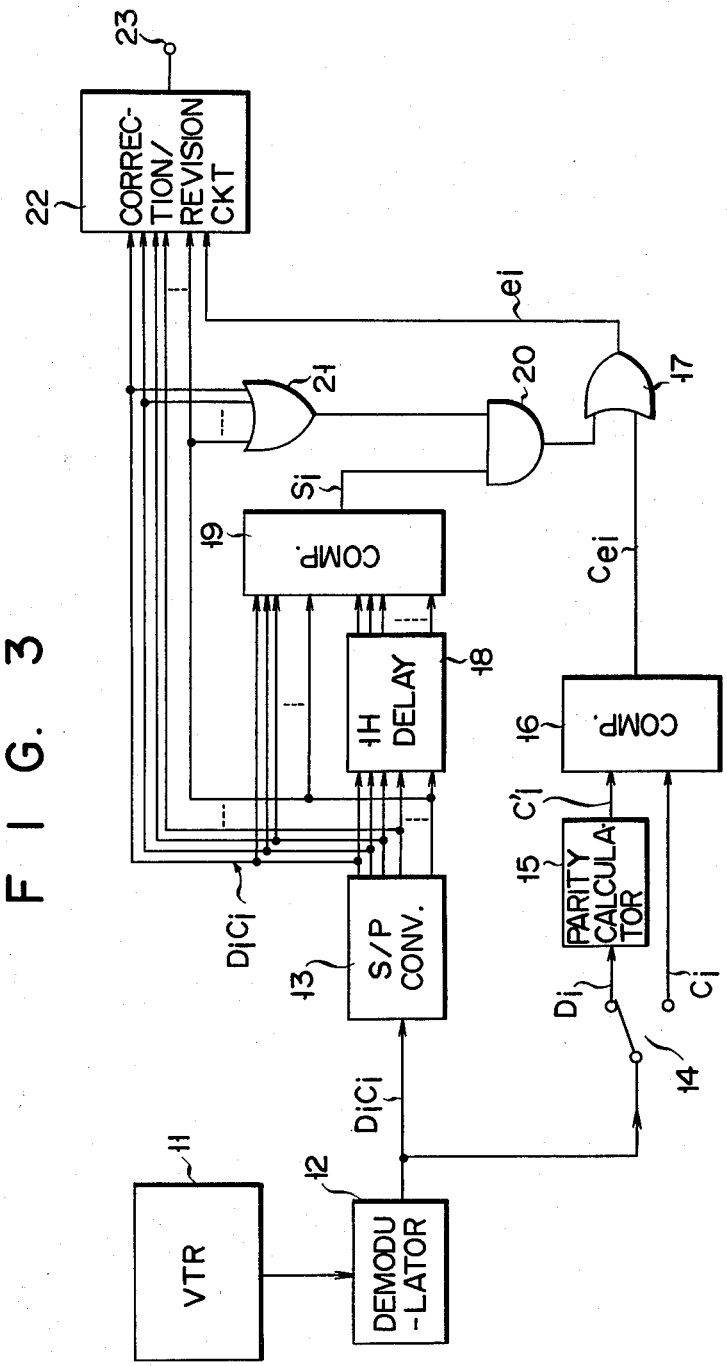
F I G. 3

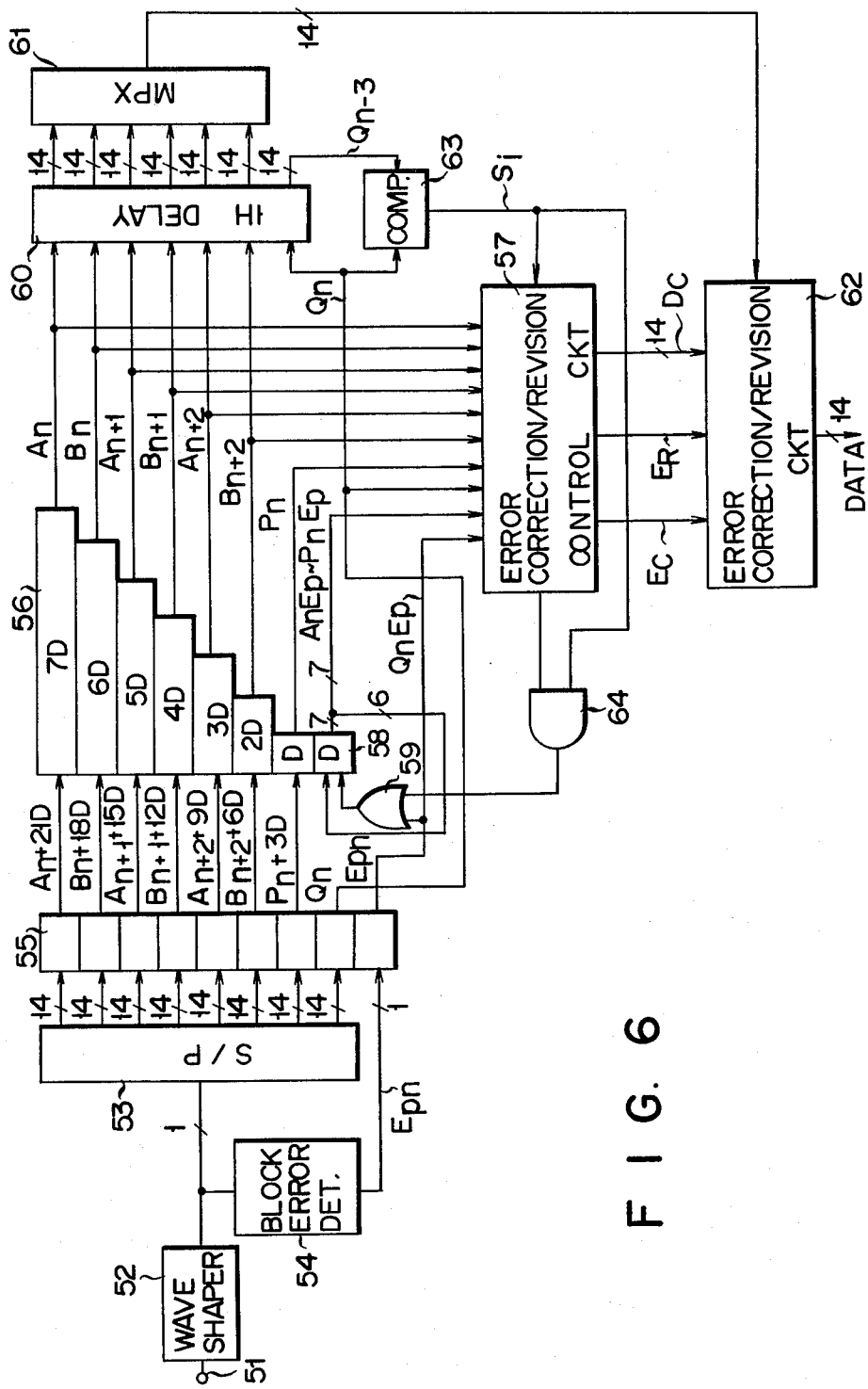
F I G. 6

SYSTEM FOR PROCESSING AUDIO PCM DIGITAL SIGNALS

BACKGROUND OF THE INVENTION

1. Field of the Invention

The invention relates to a digital signal processing system and, more particularly, to a digital signal processing system used with a reproduction apparatus having a dropout compensation function for reproducing audio information signals recorded on a recording medium in the form of digital data words together with television synchronizing signals.

2. Description of the Prior Art

A digital audio system for recording and reproducing digital audio information in a format like that of a video signal using an existing home-use video tape recorder or a video disk apparatus, has attracted attention recently. The recording/reproducing system, generally called a PCM (pulse code modulation) audio recording/reproducing system, can remarkably improve noise, distortion, wow-flutter and the like. In the system, however, due to scratches of a magnetic tape or a disk or dirts thereon the signal dropouts often occur during a signal reproduction. In preparation for the dropout, the recording/reproducing apparatus such as a video tape recorder is usually provided with a dropout compensation circuit which interpolates a dropped out signal with a signal before one horizontal scanning line. The dropout compensation is based on the fact that a video signal such as a television signal has an extremely high correlation between signals on adjacent horizontal scanning lines. Unlike the video signal, however, an audio signal conversely is extremely low in such a correlation. If the technique of the dropout compensation for video signal is applied to the audio signal dropout compensation, a dropped out audio signal is interpolated by a signal which is not correlated to the dropped out signal, leading to signal quality deterioration such as increase in noises.

The PCM recording/reproducing apparatus has an error correction/revision circuit arranged to detect whether a digital word reproduced is in error or not by an error detecting code, and correct the erroneous word when an error is detected, or revise or conceal the erroneous word by an average value of correct words which are adjacent to the erroneous word and have a high correlation therebetween if the correction is impossible. In the PCM recording/repeoducing system using the above-mentioned recording/reproducing apparatus having the dropout-compensation circuit, when the signal dropout takes place, the error detection is impossible, since no error is contained in the data word interpolated with the data word before one horizontal line period. Therefore, the error correction/revision circuit cannot revise the interpolated data word as an erroneous data word. When a dropout-compensated data word is present, there is a great possibility that the error correction/revision circuit erroneously corrects other erroneous data. The dropout compensation function of the video tape recorder or the video disk apparatus is almost ineffective for the PCM audio system. For the PCM audio recording/reproducing system using the apparatus with such a dropout compensation function, it is desirable to be able to detect the dropout compensation and to cause the error correction/revision circuit to properly correct or revise erroneous data words.

SUMMARY OF THE INVENTION

Accordingly, a object of the present invention is to provide a reproduced signal processing system which is used for reproducing an audio information signal recorded on a record medium in the form of digital data words by using an reproduction apparatus having a dropout-compensating circuit, and enables an error correction/revision circuit to properly operate regardless of the dropout-compensation.

The reproduced digital signal processing system according to the invention is characterized by comprising circuit means for detecting whether a digital audio signal reproduced through the dropout-compensation circuit is dropout-compensated or not, and circuit means for adding an error pointer to a reproduced signal detected as being dropout-compensated.

The dropout-compensation is detected in a manner that a reproduced digital signal is delayed by a time substantially equal to a delay time used in the dropout-compensation and then bit patterns of non-delayed and delayed digital signals are compared with each other.

Advantages provided by the present invention reside in that an error correction/revision circuit can properly revise data whose probability of dropout-compensation is great and prevent an erroneous correction of other erroneous data.

BRIEF DESCRIPTION OF THE DRAWINGS

This invention can be more fully understood from the following detailed description when taken in conjunction with the accompanying drawings, in which:

FIG. 3 is a block diagram of a reproduced digital signal processing system according to an embodiment of this invention;

FIG. 6 is a block diagram of a PCM reproducing system including the digital signal processing system of this invention;

DETAILED DESCRIPTION OF THE PREFERRED EMBODIMENTS

Figure 1:
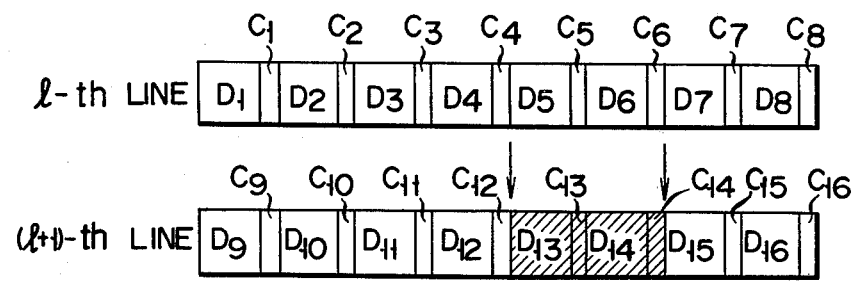
FIG. 1 is a diagram useful in explaining the dropout-compensation of data reproduced through a dropout-compensation circuit from a recording emdium.

As shown in FIG. 1, PCM signals may be recorded on a recording medium in such a format that eight data words D1 to D8 (D9 to D16) having the same number of bits, respectively, are followed by error-detecting codes or parity-check codes C1 to C8 (C8 to C16) within one horizontal scanning line period (1H period). If the data words D13 and D14 and the error-detecting codes C13 and C14 on the (l+1)th line are dropped out, the data words and the error-detecting codes, respectively, are interpolated with the data words D5 and D6 and the error-detecting codes C5 and C6 on the lth line before 1H period by a dropout-compensating circuit as described later. Accordingly, the data arrangement on the (l+1)th line becomes greatly different from the original data arrangement.

For this reason, a PCM reproducing apparatus is required to detect that the data D5 and D6 on the (l+1)th line have been interpolated, and revise those data. In this case, however, the interpolated data D5 and D6 are followed by the correct error-detecting codes C5 and C6, with the result that no error is detected. Therefore, the PCM recording/reproducing apparatus is desirably constructed to be able to detect the dropout-compensation and revise data whose probability of dropout-compensation is great.

Figure 2:
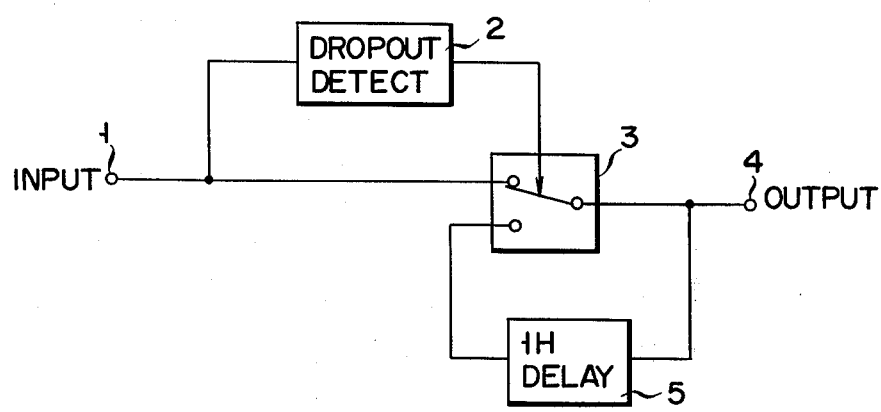
FIG. 2 is a block diagram of the dropout-compensation circuit used in a conventional video tape recorder.

Turning now to FIG. 2, there is shown a dropout compensation circuit which is normally incorporated into existing video tape recorders. The dropout of signals applied to an input terminal 1 is detected by a dropout detecting circuit 2. When no dropout is detected, the signals applied to the input terminal 1 are transferred to an output terminal 4 through a switch circuit 3. On the other hand, when the dropout is detected, the switch circuit 3 is switched to allow output signals of a 1H delay circuit 5 having an input connected to the output of switch circuit 3 for providing a delay time of one horizontal scanning total line period (63.5$\mu$) to be delivered to the output terminal 4. It will be understood that, through the dropout-compensation circuit, the dropped-out data words D13 and D14 are interpolated with the data words D5 and D6 before one horizontal scanning total line period.

Referring to FIG. 3, there is shown a PCM reproduction apparatus which includes a digital signal processing system according to an embodiment of this invention and is applied to the data format as shown in FIG. 1. In this figure, reference numeral 11 designates an existing video tape recorder (VTR) having a dropout-compensation circuit as shown in FIG. 2. The PCM audio recording/reproducing apparatus may be used in the form of an adaptor for the existing video tape recorder.

The PCM output signal $DiCi$ reproduced by the video tape recorder 11 is supplied through a demodulator circuit 12 to a serial-parallel (S/P) converter 13 where the arrangement of data is converted from a serial form to a parallel form. The output signal $DiCi$ of the demodulator 12 is led to a switch circuit 14 where it is separated into a data word $Di$ and an error-detecting code $Ci$. The data word $Di$ is applied to a parity calculator circuit 15. The parity calculator circuit 15 forms an error-detecting code or a parity bit $Ci'$ on the basis of the data word $Di$ supplied. The error detecting code $Ci'$ is formed so at to be identical with the recorded error-detecting code $Ci$, when the reproduced data word $Di$ has no error. The error-detecting codes $Ci'$ and $Ci$ are supplied to a comparator circuit 16. As a result of the comparison, when the $Ci'$ and $Ci$ are coincident with each other, it is considered that neither the data word $Di$ nor the detecting code $Ci$ is in error, and the comparator circuit 16 produces an output signal $Cei$ of a logical level 0. When the error detecting codes $Ci'$ and $Ci$ are not coincident, it is considered that the data word $Di$ and/or the detecting code $Ci$ is in error, and the comparator circuit 16 produces an output signal $Cei$ of a logical level 1. The output signal $Cei$ of the comparator circuit 16 is applied to an OR circuit 17.

An output signal of the S/P converting circuit 13 is applied to a delay circuit 18 where it is delayed by a delay time used for the dropout-compensation, i.e. a delay time corresponding to one horizontal scanning line period (1H). The output signal of the S/P converting circuit 13 is applied to a comparator circuit 19 where it is compared with the delayed output signal from the delay circuit 18.

In the case of audio information, the correlation between samples separated from each other by several words is small. In general two samples separated by one horizontal period are not coincident with each other except those dropout-compensated. When the non-delayed signal and the delayed signal applied to the comparator 19 are not coincident with each other, it may be considered that no dropout compensation of signal is made. In this case, the comparator circuit 19 produces an output signal $Si$ of a logical level 0. When the two signals applied to the comparator 18 are coincident with each other, it may be considered that the data word has been subjected to the dropout compensation in a high probability, that is, the data word is in error. In this case, the comparator circuit 19 produces an output signal $Si$ of a logical level 1. The output signal $Si$ of the comparator circuit 19 is applied to the OR circuit 17 through an AND circuit 20.

The reason why the AND circuit 20 is used follows. There is a case where digital data words of all 0s are recorded one horizontal period apart. As a matter of course, the data words of all 0s are not dropout-compensated. Also in this condition where data words of all 0s are separated by one horizontal scanning line time, the comparator circuit 19 will produce an output signal of logical level 1 because a coincidence occurs between the two data words of all 0s. In this case, the AND circuit 20 is disabled by an output signal of logical level 0 of an OR circuit 21 for detecting an all-bit-zero data word. Accordingly, the output signal $Si$ of logical level 1 from the comparator circuit 19 is inhibited from being applied to the OR circuit 17. It is to be noted that circuits such as the AND circuit 20 and OR circuit 21 are provided so as to inhibit an output signal of logical level 1 produced by the comparator 19 to a specific state of data words, such as all-bit-zero, from being applied to an error correction circuit through the OR circuit 27 as an error pointer signal.

As seen from the foregoing description, the OR circuit 17 produces an output signal $e_i$ of logical level 1 representing the presence of error when a reproduced data word or error-detecting code is in error or when a reproduced data word has been dropout-compensated, and produces an output signal $e_i$ of logical level 0 when no error is contained in a reproduced data word or error-detecting code.

The output signal of the OR circuit 17, together with the output signal $DiCi$ from the S/P converting circuit 13, is applied to an error correction/revision circuit 22. When the error correction control signal or error pointer signal $e_i$ from the OR circuit 17, which is to be added to the data word $Di$ from the S/P converter 13, is low (logic level 0), the data word $Di$ is supplied to an output terminal 23 without being subject to correction or revision. When the control signal $e_i$ is high (logic level 1), the data word $Di$ is applied to the output terminal 23 after being corrected or revised. The data word taken out from the output terminal 23 is then subjected to digital-to-analog conversion and used to drive a loudspeaker.

As described above, according to the present invention, even when the dropout compensation is made, an error pointer signal may be added to the data word.

The circuit of FIG. 3 may be modified such that the output signals of the AND circuit 20 and the comparator circuit 16 are applied as the revision control signal and the correction control signal to the correction/revision circuit 22, with no provision of the OR circuit 16. Namely, the correction/revision circuit 22 revises the data when the revision control signal is high, and corrects the erroneous data word when the correction control signal is high.

Recently, a PCM audio recording reproducting system has been standardized in Japan, in which six audio data words and two error-correcting words or parity signals P and Q, which cooperate to form one data block within one horizontal scanning line period, are subjected to a delay interleaving before being recorded and subjected to a delay deinterleaving after being reproduced. Through the interleaving and deinterleaving processes, burst errors occurring in one data block may be remarkably reduced.

Figure 4:
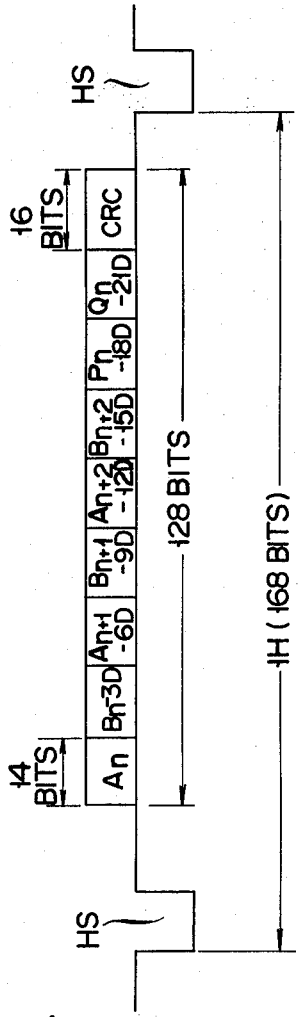
FIG. 4 is a PCM record data format to which a digital signal processing system according to another embodiment of this invention is applied.

FIG. 4 illustrates a data assignment to one horizontal segment. Interleaved data words An, Bn−3D, An+1−6D, Bn+1−9D, An+2−12D, Bn+2−15D, Pn−18D, and Qn−21D are each formed of 14 bits. A cyclic redundancy check (CRC) code is formed on the basis of the eight data words within one data block and consists of 16 bits. An interval between the adjacent horizontal synchronizing signals HS, that is, the 1H period, corresponds to 168 bits. The interleaving of D=16 blocks (16H) is equivalent to the word interleaving of 3D=48 words. In the Figure, A and B designate audio information on left and right channels, for example.

Figure 5:
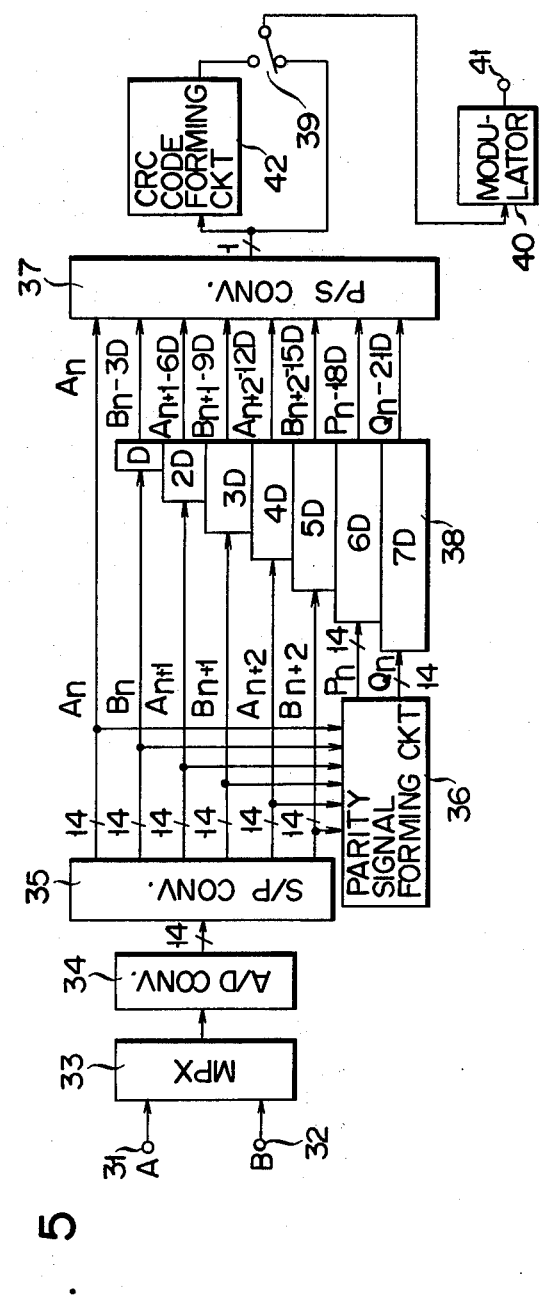
FIG. 5 is a block diagram of a system for forming the PCM record data format shown in FIG. 4.

The formation of the PCM record signal as shown in FIG. 4 will be described referring to FIG. 5. The input signals A and B applied to input terminals 31 and 32 are multiplexed by a multiplexer 33 in a time-sharing manner and then are alternately subjected to an analog-to-digital conversion by an analog-to-digital (A/D) converter 34. Each sample of the audio information signal is converted into a digital word of 14 bits. The serial data words derived from the A/D converter 34 are arranged into parallel data words by a S/P converter 35 and subjected to a time-base compression. The S/P converter 35 provides three data words for each channel, i.e. six data words An, Bn, An+1, Bn+1, An+2 and Bn+2 totally. The data words from the S/P converter 35 are applied to a parity signal forming circuit 36 to form error-correcting words Pn and Qn each consisting of 14 bits.

The output data word An from the S/P converting circuit 35 is directly applied to a parallel-to-serial (P/S) converting circuit 37 while the remaining output data words and the error-correcting words are applied through a delay interleaving circuit 38 to the P/S converting circuit 37. The delay interleaving circuit 38 is so constructed as to provide time delays in increments of a unit delay amount D (=16H) to the data words Bn, An+1, Bn+1, An+2, Bn+2, Pn and Qn in this order. Therefore, supplied to the P/S converter 37 are the interleaved data words An, Bn−3D, An+1−6D, Bn+1−9D, An+2−12D, Bn+2−15D, Pn−18D and Qn−21D.

The P/S converting circuit 37 arranges the input data words into a serial form and supplies the serial data words through a switch circuit 39 to a modulation circuit 40 in the order of An, Bn−3D, An+1−6D, Bn+1−9D, An+2−12D, Bn+2−15D, Pn−18D and Qn−21D, and also to a CRC code forming circuit 42. After the final output data word Qn−21D from the P/S converting circuit 37 is supplied to the modulation circuit 40, the switch circuit 39 is switched, so that the CRC code of 16 bits generaged by the circuit 42 is supplied to the modulation circuit 40. In this way, one data block is formed. In the modulation circuit 40, the data words are properly combined with television synchronizing signals and then applied through an output terminal 41 to a PCM recording apparatus such as a home-use video tape recorder to be recorded on a recording medium such as a magnetic tape.

A PCM audio reproduction system will be described referring to FIG. 6. A PCM signal reproduced from the magnetic tape by the video tape recorder is applied through an input terminal 51 to a wave-shaping circuit 52 where the PCM signal is wave-shaped and the data words are extracted. The data words are applied to an S/P converting circuit 53 and a block error-detecting circuit 54. The S/P converting circuit 53 arranges eight serial data words An+21D, Bn+18D, An+1+12D, An+2+9D, Bn+2+6D, Pn+3D, and Qn into a parallel form. The block error-detecting circuit detects a block error on the basis of the CRC code, and produces an error pointer signal Ep which goes high (logical level 1) when an error is detected and goes low (logical level 0) when no error is detected. The output data words from the S/P converting circuit 53 and the error pointer signal Ep from the block error-detecting circuit 54 are supplied to a buffer memory 55 to be subjected to a time-base expansion and jitter absorption. The data words An+21D, Bn+18D, An+1+15D, Bn+1+12D, An+2+9D, Bn+2+6D and Pn+3D from the buffer memory 55 are deinterleaved by a deinterleaving circuit 56 with a delay characteristic which is complementary to that of the interleaving circuit 38 shown in FIG. 5. Note here that the data words An, Bn, An+1, Bn+1, An+2, and Bn+2 and the error-correcting word Pn from the deinterleaving circuit 56 and the error-correcting word Qn from the buffer memory 55 are the data words and the error-correcting words before interleaved in FIG. 5.

The data words An, Bn, An+1, Bn+1, An+2, Bn+2, and the error-correcting words Pn and Qn are applied to an error-correction/revision control circuit 57 where syndromes are calculated.

Figure 7:
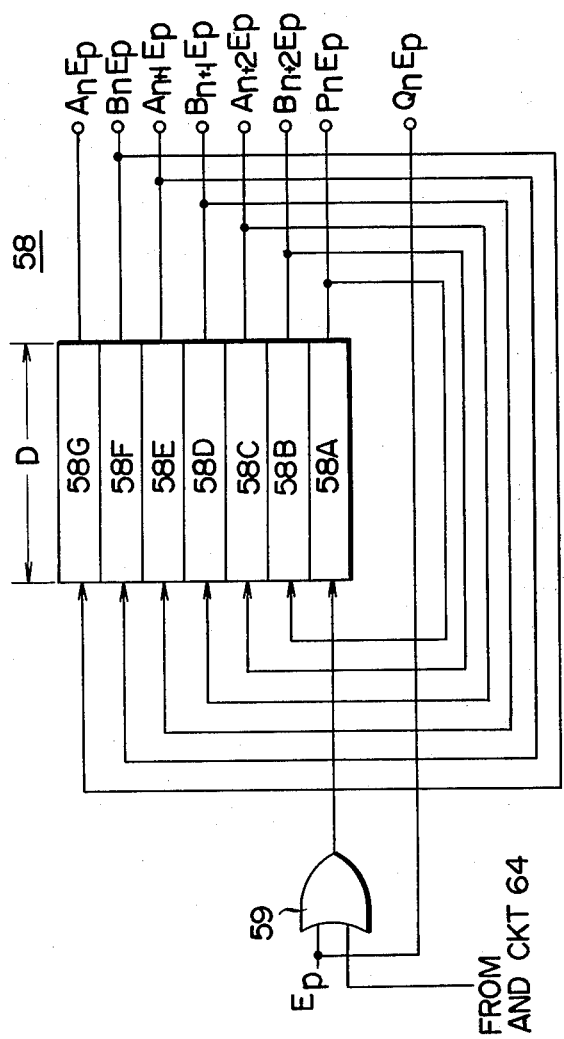
FIG. 7 is an error pointer signal adding circuit used in the system shown in FIG. 6.

The error signal Ep from the buffer memory 55 is supplied to a 7 bit×D delay circuit 58 through an OR circuit 59. The delay circuit 58 is comprised of seven one-bit delay circuits 58A to 58G each having a delay time of D, which are arranged in parallel as shown in FIG. 7. The error pointer signal Ep supplied through the OR circuit 59 is supplied to the delay circuit 58A and is also used as an error pointer signal QnEp for the error-correcting word Qn.

The delay circuits 58A to 58G are so arranged that an output of a delay circuit is coupled to an input of another delay circuit disposed just above the former as shown. With such a connection, the delay circuits 58A to 58G may provide error pointer signals, AnEp, BnEp, An+1Ep, Bn+1Ep, An+2Ep, Bn+2Ep, and PnEp to the seven words An, Bn, An+1, Bn+1, An+2, Bn+2 and Pn concurrently appearing at the outputs of the deinterleaving circuit 56. This indicates that when the block error detecting circuit 54 detects an error in one data block consisting of An+21D, Bn+18D, An+1+15D, Bn+1+12D, An+2+9D, Bn+2+6D, Pn+3D and Qn error pointers are added to the respective words of the data block. The error pointer signals AnEp to QnEp are applied to the error correction/revision control circuit 57 where an error pattern of the words An to Qn is detected.

The audio data words An to Bn+2 from the deinterleaving circuit 56 are supplied to a multiplexer circuit 61 through a delay circuit 50 which provides a delay time substantially corresponding to the delay time used for the dropout compensation, i.e. 1H period. In practice, the delay time provided by the delay circuit 60 is somewhat longer than the 1H period due to the time-base expansion. In the multiplexer circuit 61, the data words are multiplexed in a time-sharing manner. The data words multiplexed are sequentially supplied to an error correction/revision circuit 62.

The error-correcting word Qn is supplied from the buffer memory 55 to the 1H delay circuit 60 and a comparator circuit 63. The comparator circuit 63 compares the error-correcting word Qn with the error-correcting word Qn−3 delayed by the delay circuit 60. As a result of comparison, the comparator 63 produces an output signal Si which goes high when a coincidence occurs between the bit patterns of the words Qn and Qn−3 and goes low when the coincidence does not occur.

The output signal Si of the comparator 63 is applied to the error correction/revision control circuit 57 and an AND circuit 64 having an output connected to the OR circuit 59. The AND circuit 64 is enabled or disabled by the error correction/revision control circuit 57.

The error correction/revision control circuit 57 controls the error correction/revision circuit 62 so as to correct or revise one or two data words having an error on the basis of an error pattern indicated by the error pointer signals AnEp~QnEp and syndromes calculated from the words An, Bn, An+1, Bn+1, An+2, Bn+2, Pn and Qn. Since two error-correcting words are used, up to two erroneous data may be corrected. The correction/revision circuit 62 responds to a correcting data word Dc, an error revision command signal $E_R$ and an error correction command signal $E_C$, which are supplied from the control circuit 57, to correct or revise the erroneous data word supplied from the multiplexer 61, and supplies error-free data words directly to a utilization circuit.

The erroneous data (indicated by an error pointer signal) is corrected by using the other correct data words, and the error-correcting words Pn and/or Qn. Accordingly, in correcting data words it is necessary to check an output state of the comparator circuit 63. Suppose now that an erroneous data word or words among the data words An to Bn+2 are indicated by an error pointer signal or signals and QnEp=0 (the error-correcting word Qn is not in error). Under this condition, when the output signal Si of comparator 63 is low there arises no problem even if the erroneous data is corrected using the error-correcting word Qn. On the other hand, when the output signal Si of the comparator 63 is high, the error-correcting word Qn has been possibly dropout-compensated and therefore if the erroneous data is corrected using the correcting word Qn, an erroneous correction will be made. However, in the present invention, the control circuit 57 is responsive to the output state of the comparator 63 to cause the error correction/revision circuit 62 to revise the erroneous data word instead of correcting it. Thus, in such a case, the control circuit 57 enables the AND circuit 64, so that the output signal Si of logical level 1 from the comparator 63 is supplied through the OR circuit 59 to the delay circuit 58. In other words, error pointers may be added to the other data words in a data block in which the dropout-compensated error-correcting word Qn is included for the purpose of subsequent correction or revision of the other data words.

What we claim is:

1. A reproduced digital audio information signal processing system used with a reproducing system having a dropout compensation circuit for reproducing audio information signals recorded on a recording medium in the form of digital data words through said dropout compensation circuit comprising:
   dropout compensation detecting means for detecting whether a reproduced digital signal is dropout-compensated or not; and
   means responsive to said dropout compensation detecting means to add an error pointer signal to said reproduced digital signal when said reproduced digital signal is detected as being dropout-compensated.

2. A system according to claim 1, wherein said dropout compensation detecting means includes a delay circuit for delaying a reproduced digital signal by a delay time used in the dropout compensation, and a comparator circuit for comparing the reproduced digital signal delayed by said delay circuit with the reproduced digital signal before being delayed.

3. A system according to claim 2, wherein said delay time is substantially equal to one horizontal scanning total line time in a television signal.

4. A PCM recording/reproducing system in which a plurality of digital words delay-interleaved and a cyclic redundancy check code formed on the basis of the digital words are recorded on a recording medium in one data block, the data block is reproduced through a dropout compensation circuit, and the digital words reproduced are delay-deinterleaved, said system comprising:
   dropout compensation detecting means for detecting whether a data block is dropout-compensated or not on the basis of one data word in the reproduced data block; and
   means responsive to said dropout compensation detecting means to add an error pointer signal to the remaining data words within said data block when said data word is detected as being dropout-compensated.

* * * * *